(12) United States Patent
Michaud et al.

(10) Patent No.: US 11,900,585 B2
(45) Date of Patent: Feb. 13, 2024

(54) SYSTEM AND METHOD FOR INSPECTION OF A SEWER LINE USING MACHINE LEARNING

(71) Applicant: CAN-EXPLORE INC., Québec (CA)

(72) Inventors: Sébastien Michaud, Québec (CA); Francis Brochu, Québec (CA)

(73) Assignee: CAN-EXPLORE INC., Quebec (CA)

( * ) Notice: Subject to any disclaimer, the term of this patent is extended or adjusted under 35 U.S.C. 154(b) by 592 days.

(21) Appl. No.: 17/119,140

(22) Filed: Dec. 11, 2020

(65) Prior Publication Data

US 2021/0181119 A1    Jun. 17, 2021

Related U.S. Application Data

(60) Provisional application No. 62/946,694, filed on Dec. 11, 2019.

(51) Int. Cl.
| | |
|---|---|
| *G06T 7/00* | (2017.01) |
| *G06F 16/58* | (2019.01) |
| *G06F 16/535* | (2019.01) |
| *G06V 10/82* | (2022.01) |

(Continued)

(52) U.S. Cl.
CPC ............ *G06T 7/0008* (2013.01); *F16L 55/26* (2013.01); *G06F 16/535* (2019.01); *G06F 16/55* (2019.01); *G06F 16/58* (2019.01); *G06V 10/82* (2022.01)

(58) Field of Classification Search
None
See application file for complete search history.

(56) References Cited

U.S. PATENT DOCUMENTS

| | | | |
|---|---|---|---|
| 10,876,919 B2 * | 12/2020 | Randhawa | G01M 3/2807 |
| 2003/0023404 A1 * | 1/2003 | Moselhi | G01N 21/954 |
| | | | 702/181 |

(Continued)

OTHER PUBLICATIONS

Kirkham, R.—"PIRAT—A System for Quantitative Sewer Pipe Assessment"—The International Journal of Robotics Research—2000, pp. 1033-1053 (Year: 2000).*

(Continued)

*Primary Examiner* — Bernard Krasnic
(74) *Attorney, Agent, or Firm* — Dinsmore & Shohl LLP

(57) ABSTRACT

A system for performing automated inspection of a sewer line using machine learning. The system comprises a inspection data database storing sewer inspection data including images and metadata associated therewith; an inspection upload module receiving and uploading the sewer inspection data to the inspection data database; and an inspection module receiving the sewer inspection data from the inspection data database and generating therefrom identification data including characteristics of the sewer line identified and categorized. The identification module uses at least one machine learning model processing the sewer inspection data and determining whether at least one sewer specific characteristic is identifiable in the images and categorizing the at least one sewer specific, using a plurality of hierarchical classes where a top class performs the determination of whether the at least one sewer specific characteristic is present and the identification thereof and lower classes perform categorization in decreasing abstraction levels.

6 Claims, 5 Drawing Sheets

(51) Int. Cl.
   *F16L 55/26*   (2006.01)
   *G06F 16/55*   (2019.01)

(56) References Cited

U.S. PATENT DOCUMENTS

2017/0323163 A1* 11/2017 Leung .................... H04N 23/60
2020/0111222 A1*  4/2020 Asmari ................ G06V 20/182

OTHER PUBLICATIONS

Xie, Q.—"Automatic Detection and Classification of Sewer Defects via Hierarchical Deep Learning"—IEEE—Oct. 2019, pp. 1836-1847 (Year: 2019).*

Hengmeechai, J.—"Automated Analysis of Sewer Inspection Closed Circuit Television Videos Using Image Processing Techniques"—University of Regina 2013 Thesis—pp. 1-136 (Year: 2013).*

* cited by examiner

SYSTEM AND METHOD FOR INSPECTION OF A SEWER LINE USING MACHINE LEARNING

CROSS-REFERENCE TO RELATED APPLICATIONS

This application claims priority under 35 USC § 119(e) of U.S. provisional patent application(s) 62/946,694, the specification of which being hereby incorporated by reference.

TECHNICAL FIELD OF THE INVENTION

The present invention relates to the field of sewer line inspection. More particularly, it relates to a system and a method for performing sewer line inspection using images of a sewer line taken by a field technician and where machine learning is provided for analyzing the images of the sewer line and performing identification and categorization of sewer specific characteristics impacting on the condition and/or the performance thereof, to allow, for example, subsequent maintenance of the sewer, If required.

BACKGROUND

In the field of sewer line inspection, it is common practice to dispatch one or more field technician(s) on premises where a sewer line to be inspected is located. The technicians perform the capture of images from inside the sewer line, using adequate equipment and methods, to offer a complete inner view of the sewer line to be inspected (or the section thereof). For example and without being limitative, the images can be acquired via the capture of a video of the inside of the sewer using a robot having a camera mounted thereon and circulating inside the sewer line. Once the video is captured, the video can be used for subsequent analysis or a series of images can be extracted from the videos for the subsequent analysis. For example, the subsequent analysis can be performed by a trained analyst.

Traditionally, after being acquired by the filed technician(s), the captured images are stored on a server or other type of computer capable of storing and communicating data, such that the images are accessible by a computing device used by an analyst. Hence, using the computing device, the analyst can display the images on a display screen and manually review the images to proceed with the inspection of the sewer line and perform the identification and categorization of the sewer specific characteristics impacting, for example, on the description, condition and/or the performance thereof. Once the manual inspection has been performed by the analyst using the computing device, the analyst can produce a report of the inspection.

Such manual review of the images by an analyst is a tedious task that is time consuming, therefore resulting in financial loss stemming from the inefficient use of manpower by an employer. Moreover, manual review from an analyst can be prone to human error, where an analyst misinterprets the images of the interior of the sewer, therefore leading to inaccurate identifications and/or categorization of the characteristics thereof. Such inaccuracies can once again have negative financial impacts (for example, for the owner of the sewer line which proceeds to the maintenance, restoration, certification, etc. of the sewer line based on the findings of the corresponding report).

In view of the above, there is a need for an improved method and/or system for inspection of a sewer line which, by virtue of its design and components, would be able to overcome or at least minimize some of the above-discussed prior art concerns.

SUMMARY OF THE INVENTION

In accordance with a first general aspect, there is provided a system for performing automated inspection of a sewer line using machine learning. The system comprises: an inspection data database, an inspection upload module and an identification module. The inspection data database is configured to receive and store sewer inspection data including images of the sewer line and sewer inspection metadata associated to the images. The inspection upload module is configured to receive the sewer inspection data and upload the sewer inspection data to the inspection data database for storage thereof. The identification module receives the sewer inspection data from the inspection data database and is configured to generate therefrom identification data including characteristics of the sewer line identified and categorized. The identification module uses at least one machine learning model configured to process the sewer inspection data and to determine whether at least one sewer specific characteristic is identifiable in the images of the sewer inspection data. In the affirmative, at least one machine learning model identifies and categorizes the at least one sewer specific characteristic in the images of the sewer inspection data, using the combination of the images and the sewer specific metadata of the sewer inspection data. The at least one machine learning model comprises a plurality of hierarchical classes where a top class performs the determination of whether the at least one sewer specific characteristic is present and, in the affirmative, the identification thereof and lower classes perform categorization in decreasing abstraction levels.

In an embodiment, the system further comprises a report production module receiving the identification data from the identification module and displaying at least a portion of the identification data on a graphical user interface.

In an embodiment, the report production module is further configured to receive feedback data relative to the identification data based on inputs inputted via an analyst computing device displaying the graphical user interface to an analyst.

In an embodiment, the at least one machine learning model is trained using a training data set stored in a training database and comprising examples including exemplary images of the sewer line and metadata associated to the exemplary images.

In an embodiment, the training data set is updated using the sewer inspection data including images and sewer specific inspection metadata labelled using the feedback data.

In an embodiment, the report production module is further configured to generate an inspection report from a report template. The inspection report includes at least a portion of one of the identification data and the feedback data.

In an embodiment, the inspection upload module is configured to receive the sewer inspection data from an inspection device performing on-site sewer inspection.

In an embodiment, the at least one machine learning model comprises a convolutional neural network model.

In an embodiment, the at least one machine learning model comprises one of a Branch Convolutional Neural Network (B-CNN) model, a Hierarchical Classification with Neural Network (HiNet) model and a Residual Branch Convolutional Neural Network (Residual B-CNN) model.

In an embodiment, the system comprises a plurality of distinct machine learning models. Each one of the plurality of distinct machine learning models is configured to identify and categorize a specific sewer specific characteristic in the images of the sewer inspection data.

In accordance with another general aspect, there is provided a method for performing automatic inspection of a sewer line using machine learning. The method includes the steps of: receiving sewer inspection data including images and sewer specific inspection metadata from a user device; automatically analyzing the images and the metadata of the sewer inspection data using at least one machine learning model to identify one of a presence or an absence of at least one sewer specific characteristic in the images, the characteristic being identified using a top hierarchical class of a corresponding one of the at least one machine learning model; further analyzing the sewer inspection data using the at least one machine learning model to characterize each one of the previously identified characteristics, each one of the characteristics being characterized using lower hierarchical classes of the corresponding one of the at least one machine learning model each having decreasing abstraction levels; and transmitting the identified at least one sewer specific characteristic and characterization thereof, or the absence of the at least one sewer specific characteristic, to a graphical user interface displayable on an analyst computing device.

In an embodiment, the method further comprises the steps of receiving feedback data relative to at least one of a validation and a selection of the identified at least one sewer specific characteristic and characterization thereof, or the absence of the at least one sewer specific characteristic, the feedback data being based on inputs inputted on the analyst computing device.

In an embodiment, the method further comprises the step of generating an inspection report from a report template. The inspection report includes at least a portion of one of the feedback data and the identified at least one sewer specific characteristic and characterization thereof, or the absence of the at least one sewer specific characteristic.

In an embodiment, the method further comprises the step of updating a training data set used for training the at least one machine learning model, using the sewer inspection data including images and sewer specific inspection metadata labelled using the feedback data.

In an embodiment, the method further comprises an initial step of acquiring the sewer inspection using an inspection device capturing images of an inner surface of the sewer line.

In an embodiment, the step of automatically analyzing the images and the metadata of the sewer inspection data using at least one machine learning model comprises identifying and categorizing each specific sewer specific characteristic in the images of the sewer inspection data, using a distinct machine learning model configured to identify and categorize the specific sewer specific characteristic in the images of the sewer inspection data.

In an embodiment, the step of automatically analyzing the images and the metadata of the sewer inspection data using at least one machine learning model comprises automatically analyzing the images and the metadata of the sewer inspection data using at least one convolutional neural network model.

In an embodiment, the step of automatically analyzing the images and the metadata of the sewer inspection data using at least one convolutional neural network model comprises automatically analyzing the images and the metadata of the sewer inspection data using at least one of a Branch Convolutional Neural Network (B-CNN) model, a Hierarchical Classification with Neural Network (HiNet) model and a Residual Branch Convolutional Neural Network (Residual B-CNN) model.

In accordance with another aspect there is also provided a non-transitory computer readable medium having stored thereon instructions for performing automatic inspection of a sewer line using machine learning which when executed by at least one processor, causes the at least one processor to perform steps of the method as described above.

BRIEF DESCRIPTION OF THE DRAWINGS

Other objects, advantages and characteristics will become more apparent upon reading the following non-restrictive description of embodiments thereof, given for the purpose of exemplification only, with reference to the accompanying drawings in which.

DETAILED DESCRIPTION

Figure 1:
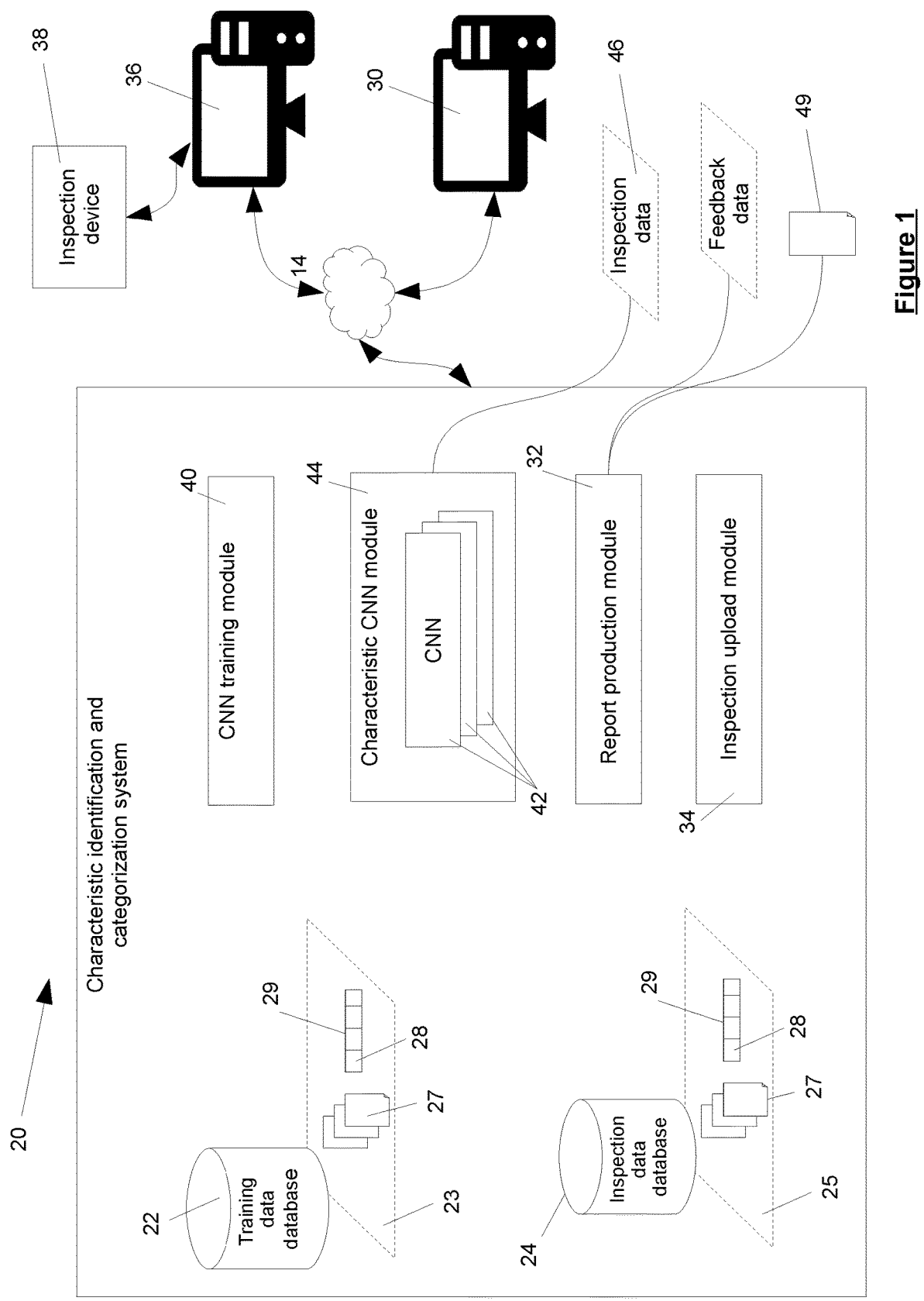
FIG. 1 is a schematic representation of a characteristic identification and categorization system, in accordance with an embodiment.

In the following description, the same numerical references refer to similar elements. The embodiments, geometrical configurations, materials mentioned and/or dimensions shown in the figures or described in the present description are embodiments only, given solely for exemplification purposes.

Although the embodiments of the system for the inspection of a sewer line consist of certain components as explained and illustrated herein, not all of these components are essential and thus should not be taken in their restrictive sense. It is to be understood, as also apparent to a person skilled in the art, that other suitable components and cooperation thereinbetween, as well as other suitable geometrical configurations, can be used for the system of inspection of a sewer line, as will be briefly explained herein and as can be easily inferred herefrom by a person skilled in the art.

Moreover, although the associated method includes steps as explained and illustrated herein, not all of these steps are essential and thus should not be taken in their restrictive sense. It will be appreciated that the steps of the method for inspection of a sewer line described herein can be performed in the described order, or in any suitable order.

To provide a more concise description, some of the quantitative and qualitative expressions given herein can be qualified with the terms "about" and "substantially". It is understood that whether the terms "about" and "substantially" are used explicitly or not, every quantity or qualification given herein is meant to refer to an actual given value or qualification, and it is also meant to refer to the approximation to such given value or qualification that would reasonably be inferred based on the ordinary skill in the art, including approximations due to the experimental and/or measurement conditions for such given value.

In the course of the present description, the term "computing device" encompasses computers, servers and/or specialized electronic devices which receive, process and/or transmit data. "Computing devices" are generally part of "systems" and include processing means, such as microcontrollers and/or microprocessors, CPUs or are implemented on FPGAs, as examples only. The processing means are used in combination with storage medium, also referred to as "memory" or "storage means". Storage medium can store instructions, algorithms, rules and/or trading data to be processed. Storage medium encompasses volatile or non-volatile/persistent memory, such as registers, cache, RAM, flash memory, ROM, as examples only. The type of memory is of course chosen according to the desired use, whether it should retain instructions, or temporarily store, retain or update data.

One skilled in the art will therefore understand that each such computing device typically includes a processor (or multiple processors) that executes program instructions or modules stored in a memory or other non-transitory computer-readable storage medium or device (e.g., solid state storage devices, disk drives, etc.). The various functions disclosed hereinbelow can be embodied in such program instructions, and/or can be implemented in application-specific circuitry (e.g., ASICs or FPGAs) of the computer system. Where the computer system includes multiple computing devices, these devices can, but need not, be co-located. In some embodiments, the computer system can be a cloud-based computing system whose processing resources are shared by multiple distinct business entities or other users.

In accordance with the embodiments described in more details below, there is provided a system for the inspection of a sewer line. The system described herein is designed for identifying (or predicting) sewer specific characteristics of the sewer line, or the absence thereof, from captured images of the inside the sewer line, and for recommending the identified sewer specific characteristics and categorization thereof (or the absence of characteristics). The recommendations can subsequently be used by an analyst performing the analysis of the sewer line, using an analyst electronic device. As will be described in more details below, the system is designed to operate in a network-accessible environment, using machine learning.

As mentioned above, the system for the inspection of the sewer line is designed to perform the identification (or prediction) of the sewer specific characteristics of the sewer line and the categorization thereof based on a combination of images (i.e. an image or a sequence of images, for example in a video) taken from inside the sewer line, during a previously performed assessment of the sewer line and sewer inspection metadata associated to the images. For example and without being limitative, in an embodiment, the images are acquired using a robot having a camera mounted thereon and circulating inside the sewer line. The images can be stored in an inspection data database being part of the system or being accessible by the system.

In an embodiment, the sewer inspection metadata associated to the captured images can be automatically generated during the capture of the images, for example by the robot or another electronic device. In an alternative embodiment, the sewer inspection metadata associated to the captured images can be inputted manually by a user or can be generated by a combination of manual input and automatic generation. In an embodiment, the sewer inspection metadata can be concatenated (or joined) to the images in the inspection data database or can be associated therewith through any correlation means or process. One skilled in the art will understand that, in alternative embodiments, the sewer inspection metadata can also be stored in a distinct database linked to the inspection data database such that the corresponding sewer inspection metadata and images are correlated. Further details regarding the sewer inspection metadata associated to the corresponding images will be provided below. It will also be understood that, in the course of the present description, for ease of description and concision, the term "images" is used to refer to either a single image or a sequence of images (which includes a video presenting a plurality of successive images) showing the inside of a sewer line taken during a prior assessment of the sewer line.

The sewer specific characteristics of the sewer line can include attributes (or observation types) which are relevant to the description, condition and/or performance of the sewer line. For example and without being limitative, in an embodiment, the sewer specific characteristics of the sewer line can include attributes described in the Pipeline Assessment Certification Program® (PACP®) from NASSCO. The sewer specific characteristics of the sewer line can relate to different types of elements requiring operation and/or maintenance such as deposits in the sewer line, roots in the sewer line, infiltration in the sewer line, obstacles/obstructions in the sewer line, vermin in the sewer line, etc. The sewer specific characteristics of the sewer line could also include structural defects, such as, for example, cracks in the sewer line, fractures in the sewer line, holes in the sewer line, deformations in the sewer line, collapses of sections of the sewer line, etc. The sewer specific characteristics of the sewer line could further include construction features such as the type and condition of the taps of the sewer line, the type of access points of the sewer line, etc. In fact, one skilled in the art will understand that the sewer specific characteristics can include any characteristics of the sewer line which can be identified in the images and which is relevant for the description, condition and/or the performance of the sewer line.

As will be described in more details below, in an embodiment, the system (and the associated method) described herein use machine learning (e.g., machine learning technology, such as convolutional neural networks models (CNNs), deep belief networks models (DBNs), etc.) to identify the sewer specific characteristics (or the absence thereof) from the provided image and to perform categorization thereof. In the course of the present description, the term "machine learning" is used to refer to machine learning techniques using machine learning models for performing images analysis to allow the above-mentioned identification of the sewer specific characteristics (or the absence thereof) from the provided image and the subsequent categorization thereof.

For example and without being limitative, in an embodiment, the machine learning components used by the system can be embodied by one or more CNNs. The CNNs can include a plurality of hyperparameters that can each be tuned to obtain the model having the best performance in identifying and categorizing the sewer specific characteristics of the sewer line (or the absence thereof) from the associated images and sewer inspection metadata. For example and without being limitative, the hyperparameters can include the number of convolutional layers (an integer, for example between 2 and 10), the number of filters for each convolutional layer (an integer, for example between 16 and 128), the size of each filter (an integer, for example 3 or 5) the size of the global average pooling layer (an integer, for example 3, 5, 7 or 9) and the batch size (an integer, for example 8, 16, 32, 64 or 128). Of course, one skilled in the art will understand that other hyperparameters can be used to tune the CNNs to obtain the model having the best performance in identifying and categorizing the sewer specific characteristics of the sewer line (or the absence thereof) from the associated images and sewer inspection metadata.

In an embodiment, the CNNs (or other type of machine learning model or techniques) can be trained on training data set comprising images depicting the inside of a sewer line, each having corresponding sewer inspection metadata associated thereto. Using the training data set, the CNNs can be trained to identify and categorize the different sewer specific characteristics present in images (or the absence thereof), when subsequently presented with new images or sequence of images having similar sewer specific characteristics.

In view of the above, for ease of description, the characteristic identification and categorization system described below is portrayed herein with reference to CNNs. However, one skilled in the art will understand that this is not meant to be limiting. The characteristic identification and categorization system described hereinbelow can be implemented with any machine learning techniques or components, such as, for example and without being limitative with DBNs, a combination of DBNs and CNNs, etc.

Moreover, in an embodiment, the characteristic identification and categorization system can use a single general CNN with finely tuned hyperparameters to obtain the model performing the image analysis and predict (i.e. identify and categorize) the different sewer specific characteristics depicted in the images. One skilled in the art will however understand that, alternatively, the characteristic identification and categorization system could rather use a plurality of CNNs to obtain models, each configured to predict the occurrence of a sewer specific characteristic in the images and the categorization thereof. In such an embodiment, each one of the CNNs can have finely tuned hyperparameters to obtain models for performing the image analysis for identification and categorization of a specific sewer characteristic depicted in the images (or the absence thereof). In other words, in such an embodiment, each model obtained by a CNN can be trained for detecting and characterizing a specific sewer line characteristic. In view of the above, for example and without being limitative, the characteristic identification and categorization system can include one or more deposit identification and categorization CNNs (or models), one or more sewer root identification and categorization CNNs (or models), one or more sewer infiltration identification and categorization CNNs (or models), one or more sewer obstacle identification and categorization CNNs (or models), one or more sewer crack identification and categorization CNNs (or models), one or more sewer fracture identification and categorization CNNs (or models), one or more sewer hole identification and categorization CNNs (or models), one or more sewer deformation identification and categorization CNNs (or models), one or more sewer collapse identification and categorization CNNs (or models), one or more sewer tap identification and categorization CNNs (or models), one or more sewer access point identification and categorization CNNs (or models), etc.

As will be described in more details below, in an embodiment, the at least one CNN can also have a plurality of hierarchical classes with a top class being configured to perform the identification of the sewer specific characteristic (or the absence thereof) and lower classes being configured to perform categorization of the identified characteristic with decreasing levels or abstraction (i.e. the lower the class, the finer the prediction for the categorization of the characteristic).

In another embodiment (not shown), the characteristic identification and categorization system could use a plurality of CNNs hierarchically arranged to perform the identification and categorization. For example and without being limitative, in an embodiment, the characteristic identification and categorization system can use a first characteristic identification model obtained from a first CNN and trained using a plurality of images, with the first CNN having finely tuned hyperparameters to predict the presence or absence of a sewer specific characteristic in the images and the characteristic identification and categorization system could select one or more characteristic categorization model obtained from CNNs that are associated with the identified characteristic type and are specifically trained using a plurality of images related to this sewer specific characteristic with the corresponding CNNs having finely tuned hyperparameters to predict the proper categorization of the identified characteristic. Once again, the characteristic categorization models obtained from the CNNs could have different abstraction levels and work together to perform the categorization of the identified sewer specific characteristic (i.e. characteristic categorization models obtained from CNNs with decreasing levels of abstraction levels (i.e. from coarse to fine predictions) could be used to ultimately categorize the characteristic). One skilled in the art will understand that other combinations of models obtained from CNNs could also be used.

Detailed Description of the System

FIG. 1 shows the characteristic identification and categorization system 20 in accordance with an embodiment. As discussed above, the characteristic identification and categorization system 20 is configured to perform two main operations: 1) train the at least one model obtained from CNNs and 2) subsequently perform the identification and characterization of the sewer specific characteristics in images.

Training CNNs

In an embodiment, the characteristic identification and categorization system 20 is in data communication with a training data database 22 storing a training data set 23 including multiple examples for the sewer specific characteristics to be identified and categorized by the models obtained from CNNs 42 and which can be used to train the one or more models obtained from the CNNs 42. Each example of the training data set 23 includes images 27 (i.e. at least one image or sequence of images) and sewer inspection metadata 28 concatenated to (or associated to) the images 27 (i.e. metadata associated to each individual image or sequence of images and labelled according to the expected result).

In an embodiment, the sewer inspection metadata 28 are presented in a vector 29 data type, with the corresponding vector 29 being concatenated to the corresponding images 27 (i.e. the vector 29 is associated to each corresponding individual image or sequence of images). In such an embodiment, each one of the one or more elements of the vector 29 corresponds to a metadata type represented by specific value representation(s) for this metadata type. An exemplary embodiment of the different metadata types present in a metadata vector in accordance with an embodiment, along with the associated value representation in the metadata vector, is shown in the table below:

| Data type | Value representation |
|---|---|
| Material of the conduit | One hot value |
| | RPC |
| | PVC |
| | VPC |
| | AC |
| | BR |
| | CAS |
| | CMP |
| | CP |
| | PE |
| | SP |
| | WD |
| | Unknown |
| Conduit type | One hot value |
| | Sanitary |
| | Pluvial |
| | Unitary |
| | Process |
| | Discharge conduit |
| | Unknown |
| Cleaning type | One hot value |
| | No cleaning |
| | Additional cleaning |
| | Standard cleaning |
| | Unknown |
| Purpose of the inspection | One hot value |
| | Maintenance related |
| | Following reconditioning |
| | Prior to reconditioning |
| | Preliminary acceptance |
| | Evaluation |
| | Reverse recovery |
| | Unknown |
| Weather conditions | One hot value |
| | Dry |
| | Light rain |
| | Heavy rain |
| | Snow |
| | Dry temperature/Moist ground |
| | Unknown |
| Inspection direction | One hot value |
| | Downstream |
| | Upstream |
| | Unknown |
| Minimum time of an extremity of the video | Normalized between 0 and 1 |
| | Missing data: mean or median |
| Time of year | Cyclic representation by decomposing in a sin and cos value |
| | Missing data: mean or median |
| Time of day | Cyclic representation by decomposing in a sin and cos value |
| | Missing data: mean or median |

In view of the above, it will be understood that each metadata 28 can be represented by one or more values in the corresponding vector 29. In other words, a metadata 28 having multiple categories can be represented by a quantity of elements corresponding to the quantity of categories of the associated metadata 28 in the vector 29. The vector 29 is therefore composed of the combination of the one or more elements of all the metadata types.

In an embodiment, the training data database 22 can organize images 27 of the training data set 23 such that they are associated with different sewer specific characteristics to be identified, with a specific categorization of a characteristic, or the like. The training data database 22 can also include positive and negative examples associated with specific characteristics and/or the specific categorization of a characteristic. For example, a positive example can be images that include an annotation identifying a specific characteristic and/or categorization of the characteristic in the images. A negative example can be images that include an annotation indicative that an identified portion of the images is not, or does not include, the specific characteristic or categorization thereof.

In an embodiment (not shown), the training data database 22 can be external to the characteristic identification and categorization system 20 (i.e. the training data database 22 can be located on a separate system, server or the like), with the characteristic identification and categorization system 20 being in data communication therewith, for example over a communication network. In the course of the present description, the term "communication network" is used to refer to any network, which includes publicly accessible networks of linked networks, possibly operated by various distinct parties, such as the Internet, private networks, personal area networks, local area networks, wide area networks, cable networks, satellite networks, cellular telephone networks, etc. or combination thereof.

In an embodiment, the characteristic identification and categorization system 20 can include a CNN training module 40 configured to train the one or more models obtained by the CNNs 42, using some or all of the examples of the training data set 23 stored in the training data database 22. For example and without being limitative, in an embodiment, the CNN training module 40 can be configured to train the models obtained by the CNNs 42 using a portion of the examples of the training data set 23 stored in the training data database 22 and to use another portion of the examples of the training data set 23 for validating the output of the models obtained from the CNNs 42 and fine-tuning the hyperparameters of the CNNs.

In an embodiment where distinct models obtained from CNNs 42 are used for specific characteristics, the CNN training module 40 can be configured to train each model obtained from the CNNs 42 using examples of the training data set 23 associated with the specific characteristic and further with examples associated with each specific categorization of the specific characteristic. Thus, distinct models obtained from CNNs 42 can be trained on different sets of examples (i.e. different sets of images 27 and metadata 28 combinations of the training data set 23).

In some embodiments, the CNN training module 40 can be configured to further train the models obtained from the CNNs 42 by providing a series of examples and requesting the models obtained from the CNNs 42 to identify and categorize sewer specific characteristics (or recognize the absence thereof). The results can be reviewed (for example, by an administrator) and feedback regarding the results can be provided to the CNN training module 40 (e.g. positive feedback relative to a successful identification (i.e. the proper sewer specific characteristic has been identified), or negative feedback relative to an unsuccessful identification (i.e. either an incorrect sewer specific characteristic has been identified, a sewer specific characteristic has not been identified when it should have had, etc.)). The CNN training module 40 can use the feedback to further refine the hyperparameters of the associated CNNs 42 in order to generate models having a greater accuracy.

It will be understood that the CNN training module 40 can periodically retrain the one or more models obtained from the CNNs 42. For example, the CNN training module 40 can initially train each model obtained from the CNN 42. As the CNNs 42 are used and the report production module 32 is used to display the corresponding identification data 46 generated therefrom (i.e. the identified characteristics and categorization) to analysts, feedback data 48 can be generated based on inputs received from the analysts, for example by accepting or rejecting the proposed sewer specific characteristic (or the absence thereof) and/or categorization thereof provided by the characteristic identification and categorization system 20. The feedback can be provided to the CNN training module 40 and/or stored in the training data database 22. At set intervals (e.g., once a month or the like) or when a predetermined amount of feedback has been provided, the CNN training module 40 can use the feedback data 48 to update the training data set 23 using the sewer inspection data 25 including images 27 and sewer specific inspection metadata 28 labelled using the feedback data 48 and to perform a subsequent training of one or more of the models obtained from the corresponding CNN 42 (e.g., the models obtained from the CNNs 42 that are associated with the sewer specific characteristic for which a sufficient amount of feedback has been received).

Identifying and Categorizing Sewer Specific Characteristics in Images

In an embodiment, once an inspection has been performed, the sewer inspection data 25 collected during inspection is uploaded to an inspection data database 24 in data communication with the characteristic identification and categorization system 20. Similarly to the examples of the training data set 23 stored in the training data database 22, the sewer inspection data 25 includes a data set with images 27 collected during the inspection along with corresponding sewer inspection metadata 28 concatenated to the images 27. Once again, one skilled in the art will understand that, in an embodiment (not shown), the inspection data database 24 can be external to the characteristic identification and categorization system 20 (i.e. the inspection data database 24 can be located on a separate system, server or the like), with the characteristic identification and categorization system 20 being in data communication therewith, for example over a communication network. Once again, in an embodiment, the sewer inspection metadata 28 can be presented in a vector data type, where one or more element of the vector corresponds to a metadata type represented by specific value representations for this metadata type. The sewer inspection metadata 28 of the sewer inspection data 25 of the inspection data database 24 are similar to those of the examples of the training data database 22 and the exemplary embodiment of the different metadata types present in the metadata vector presented above in relation to the training data database 22 also applies herein.

Hence, when sewer inspection data 25 is uploaded to the inspection data database 24, the trained model obtained from the at least one CNN 42 of the characteristic identification and categorization system 20 can process the sewer inspection data 25 and proceed with the prediction of the presence of the sewer specific characteristics and the categorization of the characteristics. One skilled in the art will also understand that, in certain cases, the trained model obtained from the at least one CNN 42 of the characteristic identification and categorization system 20 can process the sewer inspection data 25 and predict no observation regarding the presence of sewer specific characteristics (i.e. predict that there is none of the sewer specific characteristics present in the inspected sewer line, or the associated section thereof). In an embodiment, the predictions from the trained model obtained from the at least one CNN 42 of the characteristic identification and categorization system 20 can be forwarded as suggestions to the analyst, in order to assist the analyst in his/her identification of the specific characteristics present in the inspected sewer line.

For example and without being limitative, in an embodiment, the sewer inspection data 25 can be uploaded to a user computing device 36 in data communication with the inspection data database 24, following an inspection of a sewer line, in anticipation of the preparation of an inspection report. For example and without being limitative, the sewer inspection data 25 can be uploaded to the user computing device 36 from an inspection device (38) used to perform the inspection and used in the field to acquire the sewer inspection data 25, such as, for example and without being limitative, an inspection robot, or the like.

For example, in the embodiment shown, the user computing device 36 can be in data communication with the characteristic identification and categorization system 20 over a communication network 14.

In an embodiment, the system includes an identification module 44 receiving the sewer inspection data 25 from the inspection data database 24 and configured to generate therefrom identification data 46 including characteristics of the sewer line identified and categorized from the sewer inspection data 25. In the embodiment shown, the identification module 44 is a characteristic CNN module using one or more CNNs 42 that are associated with the sewer specific characteristics to be inspected in the associated sewer line and use the models obtained from the selected CNNs 42 to identify and categorize one or more characteristics of the sewer line depicted in the images 27 (or predict the absence thereof). One skilled in the art will understand that, in an embodiment, the identification module 44 can operate to process the images using the models obtained from the distinct CNNs 42 in parallel, such that the identification module 44 can perform the identification/categorization of different sewer specific characteristics at the same time or at nearly the same time, therefore increasing the speed of the analysis. One skilled in the art will understand that in, alternative embodiment, not shown, the identification module 44 could use different machine learning model than CNN.

In an embodiment, the models obtained from the CNNs 42 used by the identification module 44 can also provide a confidence level associated with each identified and or categorized sewer specific characteristic. The identification module 44 can subsequently use the identified/categorized characteristics and confidence levels to provide recommendations to the analyst, as will be described in more details below. For example, the identification module 44 can identify/categorize the characteristics (or predict the absence thereof) that have a confidence level greater than a threshold value and suggest those characteristics to the report production module 32, which can be used by the analyst for production of the inspection report, as will be described in more details below.

Exemplary System Architecture

Figure 2:
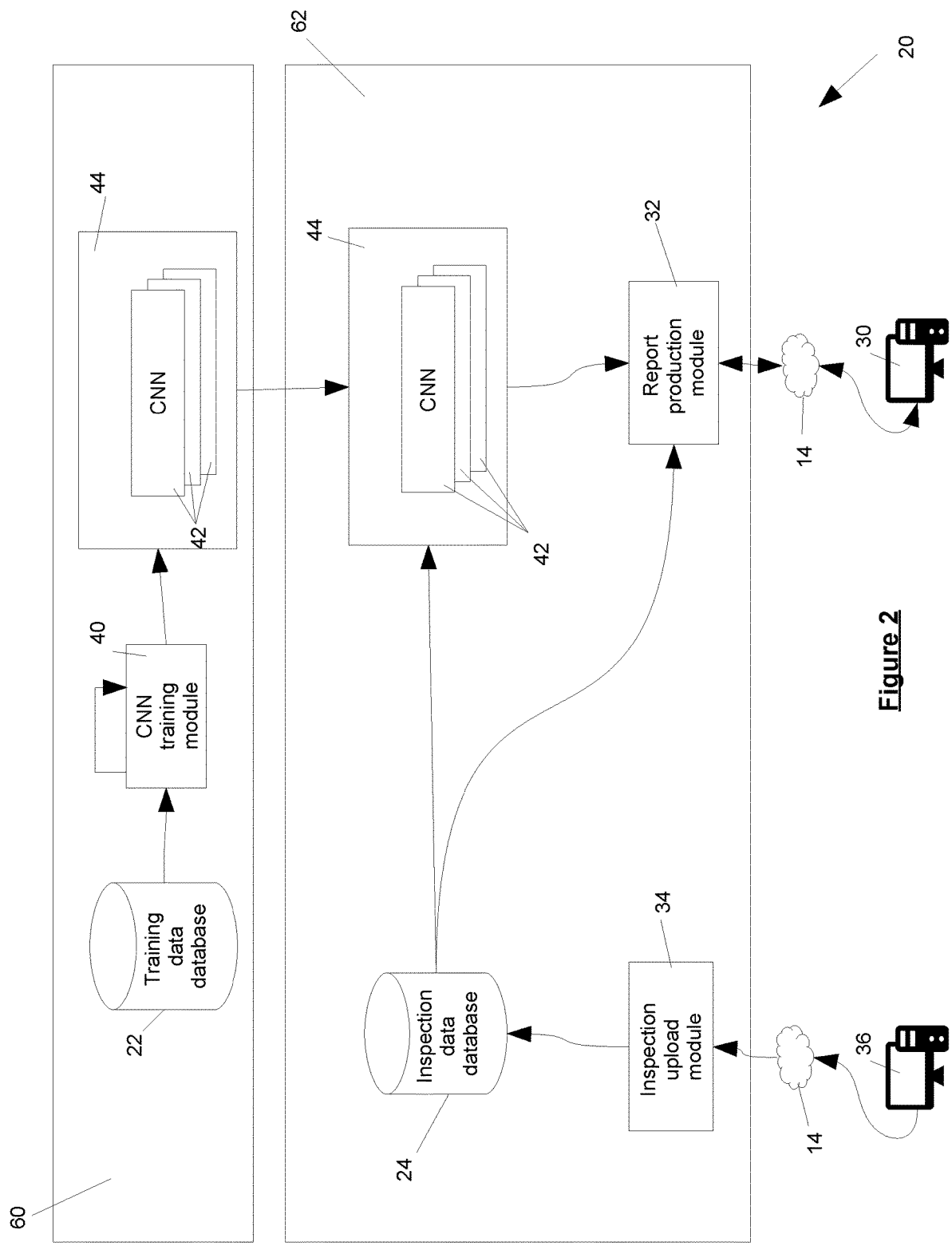
FIG. 2 is a schematic representation of the architecture of the characteristic identification and categorization system of FIG. 1, in accordance with an embodiment.

In accordance with FIG. 2, an exemplary embodiment of the architecture of the characteristic identification and categorization system 20 is shown.

In the embodiment shown, the training of the models obtained from the CNNs 42 is performed in a training environment, for example on dedicated training servers 60. For example and without being limitative, in an embodiment, the training servers 60 can be internal server of an entity performing the training, which also store the training data database 22. As mentioned above, the training data database 22 can include a training data set 23 including examples relating to previous inspection performed for which the results have been determined and/or validated, for example by an analyst, and corresponding feedback data has been generated based on the inputs received, such that the results of the identification of the characteristics and categorization of the characteristics associated with the images 27 stored thereon are known and the images 27 have been labelled accordingly. Such results are also part of the training data set 23 stored in the training data database 22 and are associated to the corresponding examples. As mentioned above, in an embodiment (not shown) the training data database 22 could also be stored on external servers in data communication with the training servers 60. Moreover, one skilled in the art will understand that the training servers 60 can be embodied by a single server or a plurality of servers in data communication with one another.

During such training, the CNN training module 40 is used to train different models obtained from CNNs 42 (i.e. models obtained from CNNs of different types) using the examples from the training data set 23 of the training data database 22 and to perform hyperparameters optimization using different CNNs types, in order to find the CNNs 42 yielding the model with the most accurate inspection results. In an embodiment, the tests for determining the CNNs 42 yielding the model having the most accurate inspection results can be performed using test examples from the training data database 22, for which the results are known but which are not used for training of the models obtained from the CNNs 42 by the CNN training module 40.

Once the models obtained from the CNNs 42 yielding the most accurate inspection results have been determined in the training environment, the identification module 44 including the models obtained from the CNNs 42 yielding the most accurate inspection results (i.e. the models obtained from the CNNs having the best CNN type and hyperparameter configuration) is imported onto the production servers 62 of a production environment. For example and without being limitative, in an embodiment, the production servers 62 can be commercial servers of a cloud computing service such as, for example, Amazon AWS or the like. One skilled in the art will understand that other types of servers having high computing capabilities rather than servers of a cloud computing service, could also be used. Moreover, one skilled in the art will readily understand that the production servers 62 can be embodied by a single server or a plurality of servers in data communication with one another.

In the embodiment shown, the production environment also includes the inspection data database 24 having stored thereon the sewer inspection data 25, the inspection upload module 34 and the report production module 32.

As can be appreciated, one skilled in the art will understand that the above-mentioned modules can be implemented via programmable computer components, such as one or more physical or virtual computers comprising a processor and memory. It is appreciated, however, that other configurations are also possible. In the embodiment shown, the inspection upload module 34 and the report production module 32 are web application modules each accessible by computing devices.

In the embodiment shown, the inspection upload module 34 can be accessed by a user computing device 36, for example over a communication network 14, and is configured to provide a user interface which allows the sewer inspection data 25 to be uploaded to the characteristic identification and categorization system 20. The inspection upload module 34 is configured to upload the sewer inspection data 25 from the user computing device 36 to the image inspection database 24. As previously mentioned, the sewer inspection data 25 includes the images 27 collected during inspection of a sewer line (which can include an image, a sequence of images, a video presenting the sequence of image or the like) and sewer inspection metadata 28 associated to the images.

In an embodiment, the sewer inspection data 25 can be uploaded from an inspection device 38 to the user computing device 36 which further operates to upload the sewer inspection data 25 to the characteristic identification and categorization system 20. In an embodiment, the user interface can be displayed on a display screen of the user computing device 36, to allow a user to upload the sewer inspection data 25 from the inspection device 38 to the user computing device 36 and subsequently upload the sewer inspection data 25 to the characteristic identification and categorization system 20. In an embodiment, the user computing device 36 can be used to edit or complete the sewer inspection data 25, before performing the upload to the characteristic identification and categorization system 20.

In view of the above, following the importation of the sewer inspection data 25 into the image inspection database 24, the identification module 44 can process the sewer inspection data 25 and perform identification/categorization of the sewer specific characteristics of the sewer line (or predict the absence thereof). The steps of the process used by the identification module 44 for identification/categorization of the characteristics of the sewer line of the corresponding sewer inspection data 25 will be described in more details below.

Once the identification module 44 has made the prediction relative to the identification/categorization of the characteristics of the sewer line, the identification data 46 generated by the identification module 44 can be transmitted to the report production module 32. In the embodiment shown, the report production module 32 is configured to transmit the identification data 46 to an analyst computing device 30, for example over a communication network 14, and is configured to provide a user interface which can be displayed on the analyst computing device 30 to display at least a portion of the identification data 46 to the analyst, including images 27 from the sewer inspection data 25 and the identified/categorized characteristics (or the absence thereof), for validation and/or for selection of the most likely identified/categorized characteristics by the analyst, during the analysis of the images 27 from the sewer inspection data 25.

In an embodiment, following the validation and/or selection of the most likely identified/categorized characteristics by the analyst, during the analysis of the images 27 from the sewer inspection data 25, the report production module 32 can receive feedback data 48 relative to the identification data 46. The feedback data 48 can be generated by the system 20 based on inputs inputted via the analyst computing device 30 displaying the graphical user interface to the analyst.

In an embodiment, the report production module 32 is further configured to automatically generate an inspection report from a report template 49. The report generated from the report template 49 includes at least a portion of one of the identification data 46 and the feedback data 48, i.e. validated and/or selected most likely identified/categorized characteristics for the corresponding inspection of the sewer line.

It will be understood that the analyst computing device 30 and the user computing device 36 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. In an embodiment, the analyst computing device 30 and/or the user computing device 36 can execute a browser application to communicate via a communication network 14 with other computing systems, such as the servers hosting the report production module 32 and/or the inspection upload module 34, in order to request and/or receive data.

Exemplary CNNs

As mentioned above and as will be described in more details below, in an embodiment, the one or more CNN 42 of the characteristic identification and categorization system 20 use a plurality of hierarchical classes with a top class being configured to perform the identification of the characteristic (or the absence thereof) and lower classes being configured to perform categorization of the identified sewer specific characteristic with decreasing levels or abstraction.

For example and without being limitative, the CNNs 42 of the characteristic identification and categorization system 20 can be one of a Branch Convolutional Neural Network (B-CNN), a Hierarchical Classification with Neural Network (HiNet), a Residual Branch Convolutional Neural Network (Residual B-CNN) or other types of hierarchical models. Embodiments of such CNNs will be described in more details below. In more details, a B-CNN model is configured to output multiple predictions ordered from coarse to fine along the stacked convolutional layers corresponding to the hierarchical structure of the target classes. A HiNet model is configured to define the class hierarchy at the end of the network with each level of the hierarchy being represented by an output layer and higher levels of the hierarchy being connected to subsequent levels. A Residual B-CNN is essentially a combination of B-CNN model and a HiNet model. Essentially, it is configured similarly to a B-CNN model with an added connection between higher levels of the hierarchy and the subsequent level.

Figure 3A:
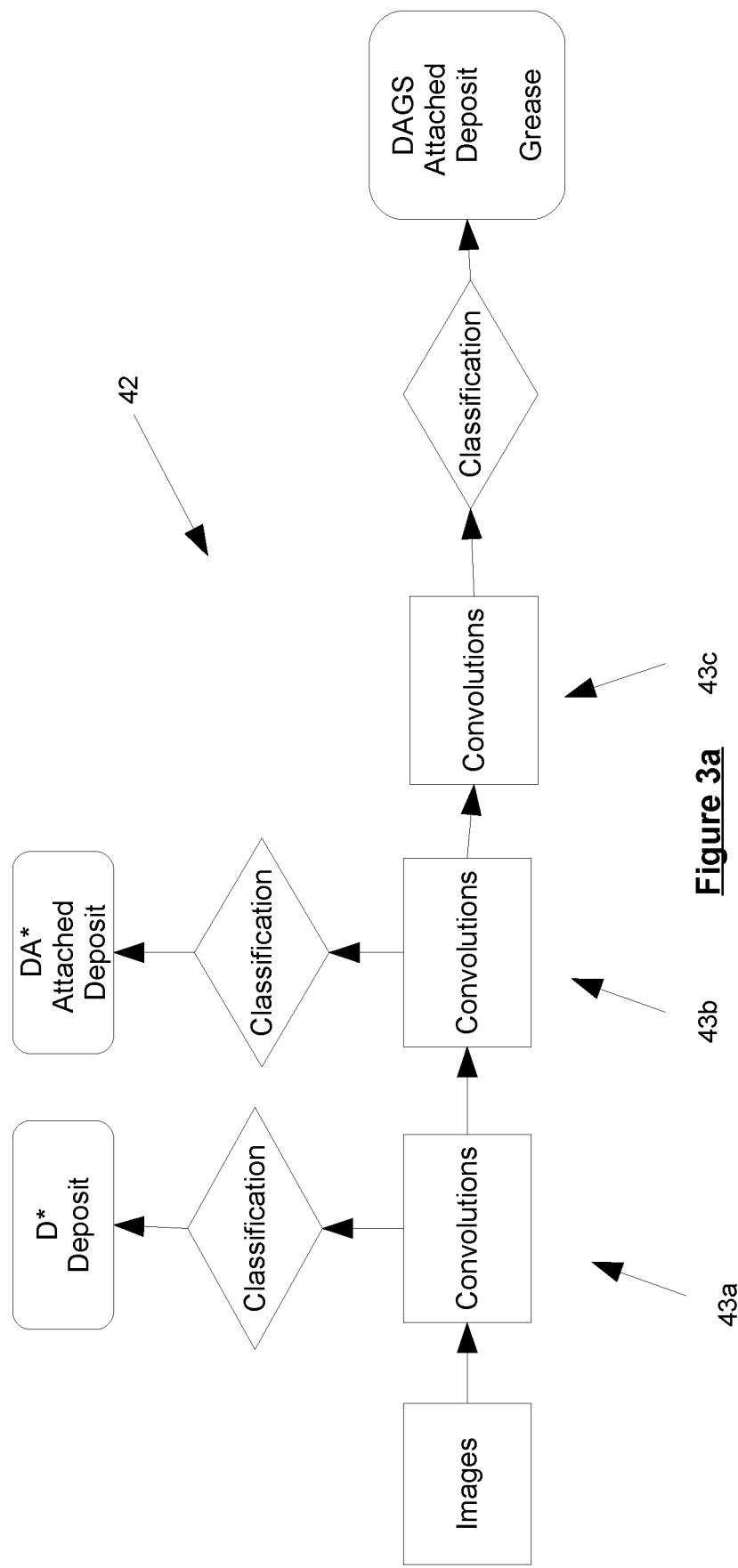
FIGS. 3a and 3b are schematic representation of Branch Convolutional Neural Networks (B-CNN) for identifying and categorizing specific characteristics of a sewer line, FIG. 3a showing a Branch Convolutional Neural Networks (B-CNN) for identifying and categorizing deposits and FIG. 3b showing a Branch Convolutional Neural Networks (B-CNN) for identifying and categorizing taps.

FIG. 3a shows a B-CNN model specifically for identifying and categorizing deposits (i.e. a deposit identification and categorization CNN) in a sewer line, in accordance with an embodiment. The deposit identification and categorization CNN of the embodiment shown, is a hierarchical model having three class levels (or convolutional layers) for predictions. The first output of the model is associated with the highest level of class hierarchy (i.e. identification of the occurrence of the sewer specific characteristic) and the subsequent outputs are associated with finer classification levels (i.e. lower abstraction levels). In the embodiment shown, the first convolutional layer 43a is configured to predict if the images 27 shows a positive instance of a deposit or a negative instance thereof (i.e. if the image 27 shows a deposit or not), the second convolutional layer 43b is configured to predict if the deposit is attached, deposited or if there is no deposit and finally, the last convolutional layer 43c is configured to predict fine classes such as whether the deposit is incrustation, grease, a fine deposit, gravel, another type of deposit or if there is no deposit.

Figure 3B:
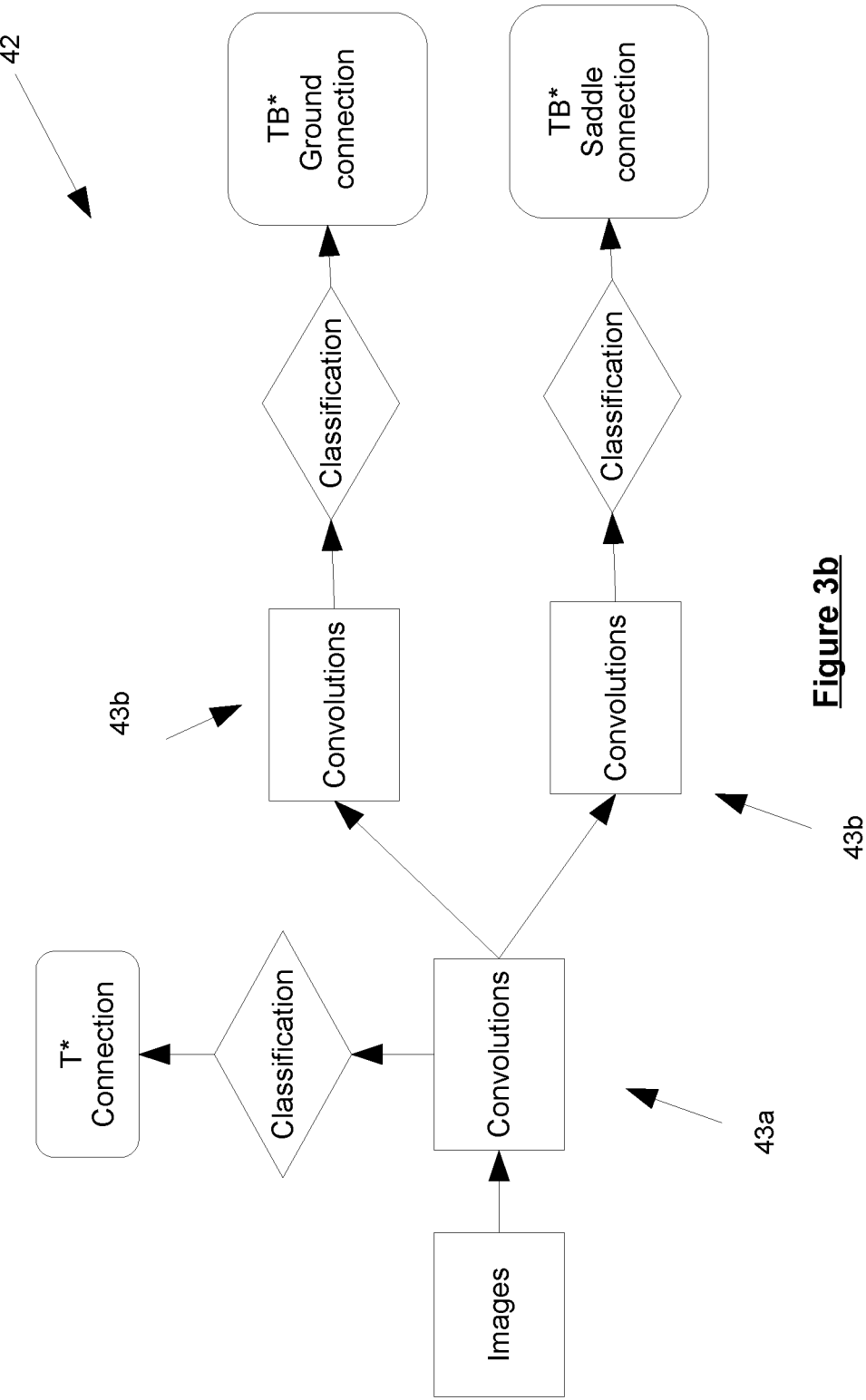

FIG. 3b shows a B-CNN model for identifying and categorizing sewer taps (i.e. a sewer tap identification and categorization CNN) in a sewer line, in accordance with an embodiment. The sewer tap identification and categorization CNN of the embodiment shown is again a hierarchical model, this time having two class level or (or convolutional layers) for predictions. The first output of the model is again associated with the highest level of class hierarchy (i.e. identification of the occurrence of the sewer specific characteristic) and the subsequent outputs are associated with finer classification level (i.e. lower abstraction levels). In the embodiment shown, the first convolutional layer 43a is configured to predict if the images 27 shows a positive instance of a tap or a negative instance thereof (i.e. if the images 27 shows a tap or not), the second convolutional layer 43b is the last layer and is configured to predict fine classes (i.e. the type of tap) such as ground tap, manufactured, saddle tap or if there is no tap.

It will be understood that the B-CNN models of FIGS. 3a and 3b are shown and described for exemplary purposes and similar models could be used for identification and categorization of other characteristics (e.g. root, infiltration, obstacle, crack, fracture, hole, deformation, collapse, access points, etc.), with adjustments relative to class levels and classification in order to adapt to the specificity of the corresponding characteristic. In each model, the hyperparameters thereof will be finely tuned to predict the proper categorization of the corresponding characteristic.

Figure 4:
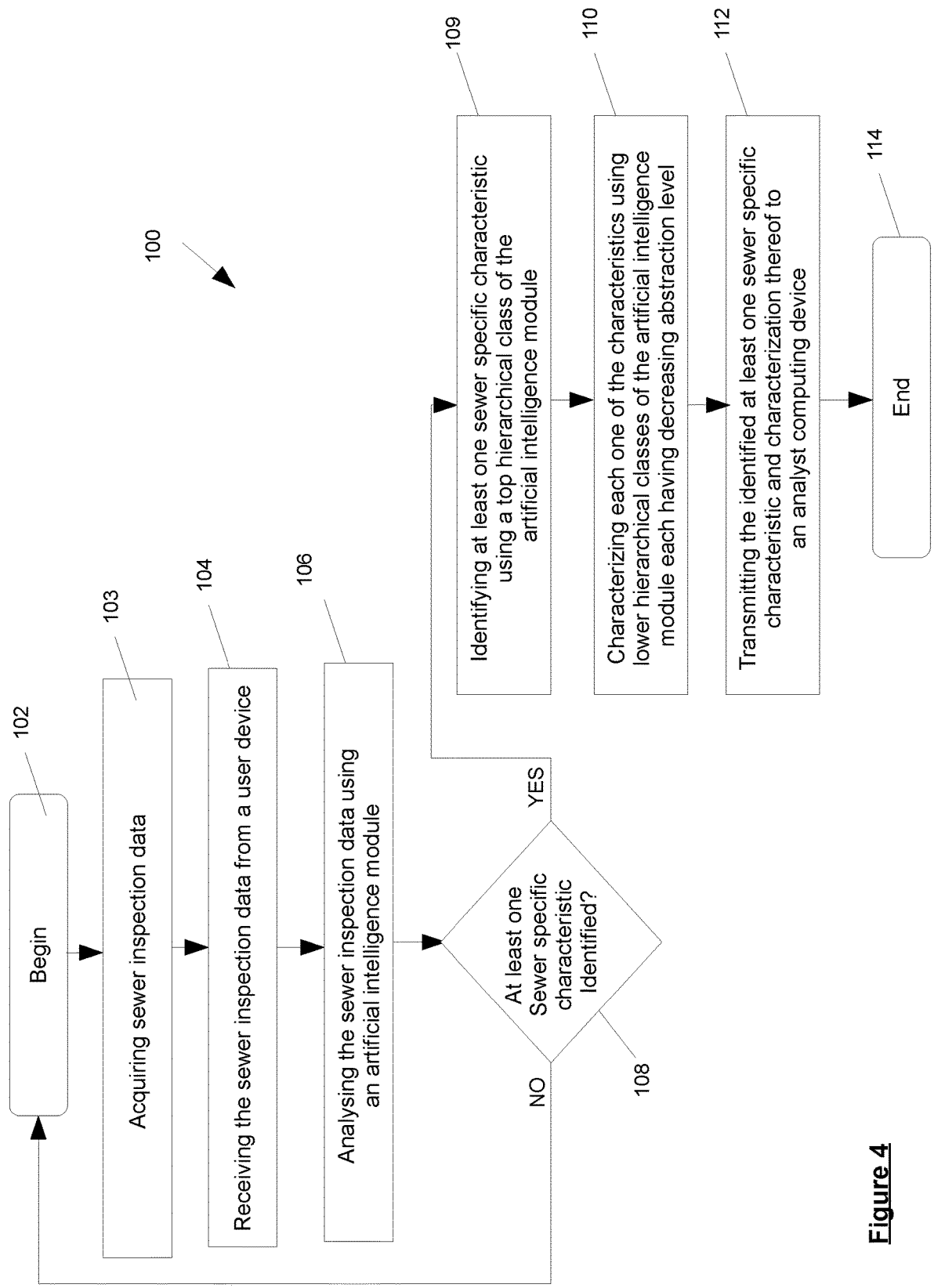
FIG. 4 is a schematic representation of a characteristic identification and categorization method, in accordance with an embodiment.

Example Process (Method) for Identifying/Characterizing a Sewer Specific Characteristic FIG. 4 illustrates a characteristic identification and categorization process (or method) 100 that can be used by the characteristic identification and categorization system 20 to identify/categorize a sewer specific characteristic, using machine learning. As an example, the characteristic identification and categorization system 20 of FIGS. 1 and 2 can be configured to implement the item characteristic identification process 100. The item characteristic identification process 100 begins at block 102.

At block 103, the method includes the step of acquiring sewer inspection data 25 using an inspection device 38 capturing images of an inner surface of the sewer line. As mentioned above the sewer inspection data 25 can include images 27 collected during inspection of the sewer line (which can include an image, a sequence of images, a video presenting the sequence of images or the like) and sewer inspection metadata 28 associated to the images 27. In an embodiment, at block 103, the method can further include a step of performing further import of metadata 28 to complete the sewer inspection data 25.

At block 104, the method includes the step of receiving the sewer inspection data 25 including images 27 and sewer specific inspection metadata 28. In an embodiment, the sewer inspection data 25 is received from a user device.

At block 106, the method includes the step of analyzing the combination of the images 27 and the sewer inspection metadata 28 to identify the presence or absence of at least one sewer specific characteristic in the images 27, using an identification module 44 including at least one trained machine learning model. In the embodiment shown and described herein the machine learning model is a CNN, but one skilled in the art will understand that other machine learning model could be used. As described above, one skilled in the art will understand that the models obtained from the CNNs can be trained to identify a specific characteristic depicted in images 27 of sewer inspection data 25 collected during a sewer inspection, based on a training data set of previous inspection images 27 and associated sewer inspection metadata 28 labelled and stored in a training data database.

At block 108, the method includes the step of determining whether at least one sewer specific characteristic is identifiable in the inspection images 27, using the CNNs. If it is positive, at block 109, the at least one sewer specific characteristic depicted in the inspection images 27 is identified using the CNNs. In an embodiment, the characteristic is identified using a top hierarchical class of the CNN.

At block 110 the method includes the step of characterizing each one of the characteristics identified at bloc 108, using the CNNs. In an embodiment, each one of the characteristics is characterized using lower hierarchical classes of the CNN each having decreasing abstraction level.

At block 112, the method includes the step of transmitting an identification and characterization of each identified characteristic, or the absence of identifiable characteristics, to an analyst computing device for validation or selection of the most likely characteristic and/or characterization thereof by the analyst, using the analyst device.

In an embodiment, the transmission of the identification and characterization of each identified characteristic, or the absence of identifiable characteristics, to the analyst computing device is performed using the report production module described above.

In an embodiment, the method includes the substep of receiving feedback data relative to at least one of a validation and a selection of the identified at least one sewer specific characteristic and characterization thereof, or the absence of the at least one sewer specific characteristic. In an embodiment, the feedback data is generated based on inputs inputted on the analyst computing device.

In an embodiment, the method also includes the further substep of generating an inspection report including at least a portion of one of the feedback data and the identified at least one sewer specific characteristic and characterization thereof, or the absence of the at least one sewer specific characteristic. In an embodiment, the inspection report is generated from a report template.

In an embodiment, the method also includes the further substep of updating the training dataset used for training the at least one trained CNN, using the sewer inspection data 25 including images 27 and sewer specific inspection metadata 28 labelled, using the feedback data.

Following the reception of the feedback including validation and/or selection from the analyst on the analyst computing device of the most likely characteristic and/or characterization thereof, from the analyst computing device, the characteristic identification and categorization method 100 can be completed, as shown in block 114.

In view of the above, it will be understood that the characteristic identification and categorization system 20 can be implemented using a single computing device, or can include multiple distinct computing devices, such as computer servers, logically or physically grouped together to collectively operate as a server system. The components of the characteristic identification and categorization system 20 can each be implemented in application-specific hardware (e.g., a server computing device with one or more application-specific integrated circuit (ASICs)) such that no software is necessary, or as a combination of hardware and software. In addition, the modules and components of the characteristic identification and categorization system 20 can be combined on one server computing device or separated individually or into groups on several server computing devices. In some embodiments, the characteristic identification and categorization system 20 can include additional or fewer components than the components illustrated in the appended figures and discussed above.

In some embodiments, the services provided by the characteristic identification and categorization system 20 can be implemented as web services. In further embodiments, the characteristic identification and categorization system 20 could be provided by one more virtual machine implemented in a hosted computing environment. The hosted computing environment can include one or more rapidly provisioned and released computing resources, which computing resources can include computing, networking and/or storage devices. A hosted computing environment can also be referred to as a cloud computing environment.

All of the methods and steps described herein can be performed and be fully automated by a computer system. The computer system can, in some cases, include multiple distinct computers or computing devices (e.g., physical servers, workstations, storage arrays, cloud computing resources, etc.) that communicate and interoperate over a communication network to perform the described steps.

As mentioned above, the various illustrative logical blocks, modules, routines, and steps described in connection with the embodiments disclosed herein can be implemented as electronic hardware (e.g., ASICs or FPGA devices), computer software running on computer hardware, or combinations of both. In skilled in the art will understand that various illustrative components, blocks, modules, and steps have been described above generally in terms of their functionality. Whether such functionality is implemented as specialized hardware versus software running on hardware depends upon the particular application and design constraints imposed on the overall system. The described functionality can be implemented in varying ways for each particular application, but such implementation decisions should not be interpreted as causing a departure from the scope of the disclosure.

Hence, it will be understood that the elements of a method, process, routine, or step described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal. It should therefore be appreciated by those skilled in the art that any block diagrams herein represent conceptual views of illustrative circuitry embodying the principles disclosed herein. Similarly, it will be appreciated that any flow charts and transmission diagrams, and the like, represent various processes which may be substantially represented in computer-readable medium and so executed by a computer or processor, whether or not such computer or processor is explicitly shown.

Several alternative embodiments and examples have been described and illustrated herein. The embodiments of the invention described above are intended to be exemplary only. A person of ordinary skill in the art would appreciate the characteristics of the individual embodiments, and the possible combinations and variations of the components. A person of ordinary skill in the art would further appreciate that any of the embodiments could be provided in any combination with the other embodiments disclosed herein. It is understood that the invention could be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous

The invention claimed is:

1. A system for performing automated inspection of a sewer line using machine learning, the system comprising:
    an inspection data database configured to receive and store sewer inspection data including images of the sewer line and sewer inspection metadata associated to the images;
    an inspection upload module configured to receive the sewer inspection data and upload the sewer inspection data to the inspection data database for storage thereof;
    an identification module receiving the sewer inspection data from the inspection data database and configured to generate therefrom identification data including characteristics of the sewer line identified and categorized, the identification module using at least one machine learning model configured to process the sewer inspection data and to determine whether at least one sewer specific characteristic is identifiable in the images of the sewer inspection data and, in the affirmative, identify and categorize the at least one sewer specific characteristic in the images of the sewer inspection data, using the combination of the images and the sewer inspection metadata of the sewer inspection data, wherein the at least one machine learning model comprises a plurality of hierarchical classes where a top class performs the determination of whether the at least one sewer specific characteristic is identifiable and, in the affirmative, the identification thereof and lower classes perform categorization in decreasing abstraction levels; and
    a report production module receiving the identification data from the identification module and displaying a generated inspection report including at least a portion of the identification data on a graphical user interface, wherein the report production module is further configured to receive feedback data relative to the identification data based on inputs inputted via an analyst computing device displaying the graphical user interface to an analyst,
    wherein the at least one machine learning model is trained using a training data set stored in a training database and comprising examples including exemplary images of the sewer line and metadata associated to the exemplary images and wherein the training data set is updated using the sewer inspection data including images and sewer specific inspection metadata labelled using the feedback data.

2. The system of claim 1, wherein the report production module is further configured to generate the inspection report from a report template, the inspection report including at least a portion of one of the identification data and the feedback data.

3. The system of claim 1, wherein the inspection upload module is configured to receive the sewer inspection data from an inspection device performing on-site sewer inspection.

4. The system of claim 1, wherein the at least one machine learning model comprises a convolutional neural network model.

5. The system of claim 4, wherein the at least one machine learning model comprises one of a Branch Convolutional Neural Network (B-CNN) model, a Hierarchical Classification with Neural Network (HiNet) model and a Residual Branch Convolutional Neural Network (Residual B-CNN) model.

6. The system of claim 1, wherein the system comprises a plurality of distinct machine learning models, each one of the plurality of distinct machine learning models being configured to identify and categorize a specific sewer specific characteristic in the images of the sewer inspection data.

* * * * *